US008547477B2

(12) United States Patent
Knödgen et al.

(10) Patent No.: US 8,547,477 B2
(45) Date of Patent: Oct. 1, 2013

(54) CAMERA SHUTTER AND POSITION CONTROL THEREOF

(75) Inventors: Horst Knödgen, Munich (DE); Frank Kronmüller, Neudenau (DE); Joachim Riexinger, Gammelshausen (DE)

(73) Assignee: RPX Corporation, San Francisco, CA (US)

( * ) Notice: Subject to any disclaimer, the term of this patent is extended or adjusted under 35 U.S.C. 154(b) by 644 days.

(21) Appl. No.: 12/658,280

(22) Filed: Feb. 5, 2010

(65) Prior Publication Data

US 2011/0176052 A1    Jul. 21, 2011

(30) Foreign Application Priority Data

Jan. 19, 2010   (EP) ..................................... 10368003

(51) Int. Cl.
*H04N 5/238*   (2006.01)
*G03B 9/08*    (2006.01)

(52) U.S. Cl.
USPC .......................................... 348/363; 396/449

(58) Field of Classification Search
USPC .............. 348/362, 345, 376, 221.1, 296, 363, 348/374–375; 396/194, 195, 444, 452, 462, 396/471, 445, 449; 318/687
See application file for complete search history.

(56) References Cited

U.S. PATENT DOCUMENTS

| | | | |
|---|---|---|---|
| 4,240,728 A * | 12/1980 | Wiedmann et al. | 396/238 |
| 5,333,025 A * | 7/1994 | Dowe | 396/469 |
| 5,517,243 A | 5/1996 | Kudo et al. | |
| 5,598,244 A | 1/1997 | Johansson | |
| 5,606,387 A * | 2/1997 | Furlani et al. | 396/470 |
| 5,617,023 A | 4/1997 | Skalski | |

(Continued)

FOREIGN PATENT DOCUMENTS

| | | |
|---|---|---|
| JP | 55 023506 | 2/1980 |
| JP | 58 139106 | 8/1983 |
| JP | 02 226130 | 9/1990 |
| WO | WO 2008/009556 | 1/2008 |

OTHER PUBLICATIONS

European Search Report 10368003.9-1240, Apr. 20, 2010, Dialog Imaging Systems GMBH.

(Continued)

*Primary Examiner* — Tuan Ho
*Assistant Examiner* — Ahmed A Berhan
(74) *Attorney, Agent, or Firm* — Howison & Arnott, L.L.P.

(57) ABSTRACT

Systems and methods using the same to achieve a precise timing of a camera shutter, which can be used also for a controllable aperture, are disclosed. A bidirectional linear motor having two coils driving the shutter blades can also be used as a position sensor. A movable iron is driven dependent upon currents through the coils and as the iron moves, the inductance of both coils changes. The difference of inductance of both coils indicates the actual position of the iron. Since the movable iron is mechanically connected to the entirety of shutter blades the difference of inductance indicates the actual position of the shutter blades. A read-out circuit senses the difference of inductance of both coils, which is indicating the actual position, and a control loop is comparing the inductance difference signal with a target signal in order to control the current through the coils in a way that the shutter blades are moved quickly to their target position.

23 Claims, 7 Drawing Sheets

(56) References Cited

U.S. PATENT DOCUMENTS

| | | |
|---|---|---|
| 6,157,100 A | 12/2000 | Mielke |
| 6,208,497 B1 | 3/2001 | Scale et al. |
| 2007/0110433 A1 | 5/2007 | Masahiko |

OTHER PUBLICATIONS

Co-Pending US Patent DI08-004, U.S. Appl. No. 12/658,508, filed Feb. 5, 2010, "Camera Shutter," assigned to the same assignee as the present invention.

Co-Pending US Patent DI09-003/004, U.S. Appl. No. 12/661,752, filed Mar. 23, 2010, "Camera Module Having a Low-Friction Movable Lens," assigned to the same assigee as the present invention.

Co-Pending US Patent DI09-007, U.S. Appl. No. 12/661,755, filed Mar. 23, 2010, "Twin-Actuator Configuration for a Camera Module," assigned to the same assignee as the present invention.

Co-Pending US Patent DI09-012, U.S. Appl. No. 12/661,756, filed Mar. 23, 2010, "Drop Detection Using Lens Position Sensing of Camera Module," assigned to the same assignee as the present invention.

* cited by examiner

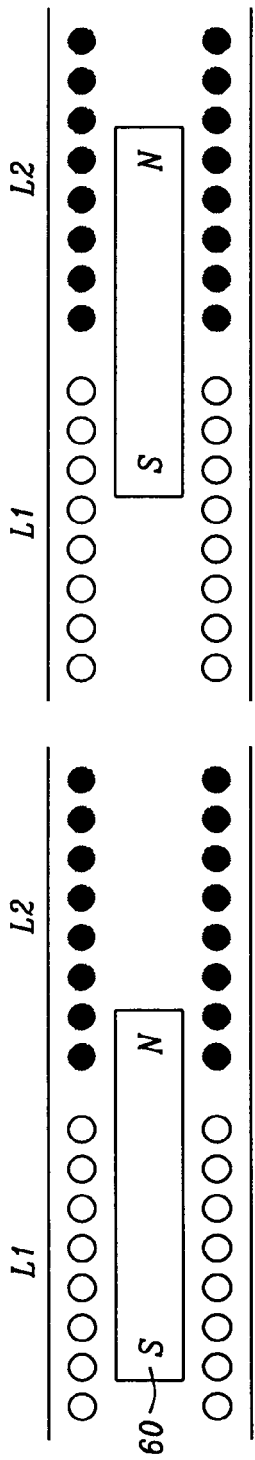
FIG. 6
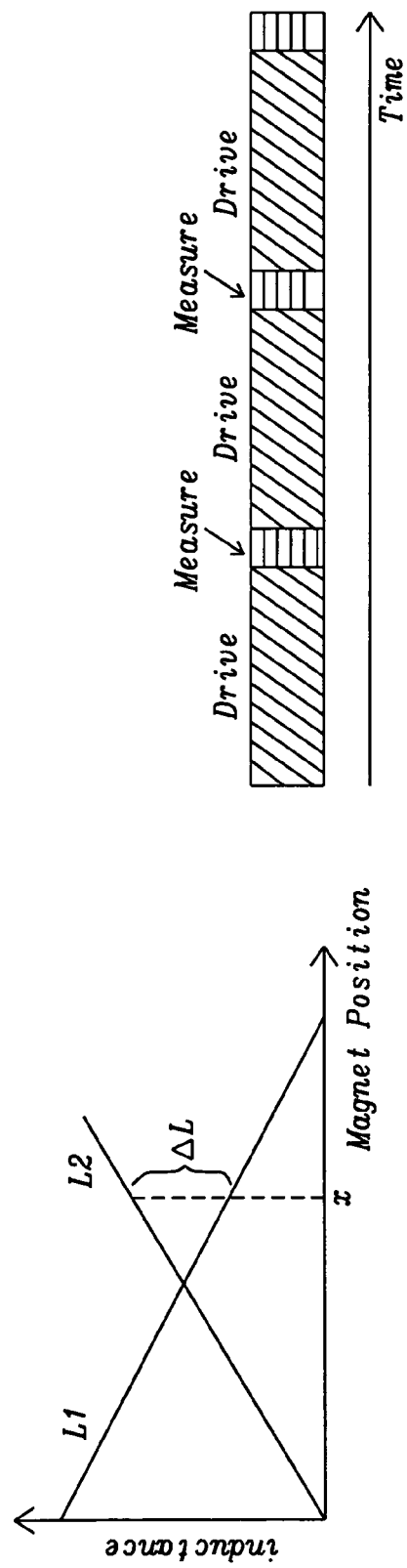
FIG. 8
FIG. 7

CAMERA SHUTTER AND POSITION CONTROL THEREOF

RELATED PATENT APPLICATIONS

This application is related to the following U.S. patent applications:

DI08-004, titled "Camera Shutter", Ser. No. 12/658,508, filing date Feb. 5, 2010, DI09-003/004, titled "Camera Module having a low-friction movable lens", Ser. No. 12/661,752, filing date Mar. 23, 2010, DI09-007, titled "Twin-actuator configuration for a camera module", Ser. No. 12/661,755, filing date Mar. 23, 2010, and DI09-012, titled "Drop Detection Using Lens Position Sensing of Camera Module", Ser. No. 12/661,756, filing date Mar. 23, 2010 and the above applications are herein incorporated by reference in their entirety.

BACKGROUND OF THE INVENTION (1) Field of the Invention

This invention relates generally to digital cameras and relates more specifically to a position control of camera shutters driven by a linear motor.

(2) Description of the Prior Art

In photography, a shutter is a device that allows light to pass for a determined period of time, for the purpose of exposing photographic film or a light-sensitive electronic sensor to light to capture a permanent image of a scene.

As light travels through a lens opening (aperture), the shutter opens and closes in a timed fashion to determine how long the image sensor ("film") gets exposed to a scene. The exposure time has a most important impact upon the quality of an image. Conventional film cameras are using usually mechanical shutters while digital cameras are often using digital shutters. It is a challenge for the designers of digital cameras to design a shutter mechanism for digital cameras, which can be exactly controlled.

The aperture of an optical system is the opening that determines the cone angle of a bundle of light rays that come to a focus in the image plane. The aperture determines how collimated the admitted rays are, which is of great importance for the appearance at the image plane. A narrow aperture will result in sharpness at the image plane, while a wide aperture will result in sharpness for light rays with the right focal length only. This means that a wide aperture results in an image that is sharp around what the lens is focusing on and blurred otherwise. The aperture also determines how many of the incoming rays are actually admitted and thus how much light that reaches the image plane, i.e. the narrower the aperture, the darker the image.

In addition, with the advancement of small portable terminals equipped with cameras having zoom functions and shutters there is a requirement of compact size shutters. Therefore there is a need of precise, compact size shutters, which are easily to be assembled.

Solutions dealing with camera shutters are described in the following patents or patent publications:

U.S. patent (U.S. Pat. No. 5,598,244 to Johansson) teaches a camera provided with means for effecting cyclic displacement of a mechanical system, such as a mirror mechanism or shutter mechanism, between two end positions. The means include spring means for biasing the system towards a neutral position or zone between the two end positions and drive means for ensuring that the system sequentially reaches said end positions.

U.S. patent (U.S. Pat. No. 6,157,100 to Mielke) discloses an electromagnetic drive for a focal-plane shutter of a camera having two light-excluding shutter curtains, each of the two shutter curtains being having its own electric drive motor, which is a linear motor constructed from permanent magnets and electromagnetic coils. The linear motor has at least two mutually aligned permanent magnets. The opposite pole faces of the magnets have the same polarity. A soft-magnetic disk is disposed between the permanent magnets. A soft-iron casing encloses the magnets and the soft-magnetic disk with an annular gap therebetween. A coil former is displaceably mounted in the annular gap such that it can exert an operating stroke between two stops. The coil former has a drive element for transferring the axial displacement of the coil former to the assigned shutter curtain.

U.S. Patent Publication (US 2007/0110433 to Masahiko) describes a shutter driving apparatus for a camera module having a shutter driving section constructed to slidingly move shutter blades provided to a camera lens module in both sideward directions to thereby open and close a lens opening. The shutter driving apparatus comprises a lens housing; a pair of shutter blades provided to the lens housing to be slidingly moved in a lengthwise direction of the lens housing to thereby open and close a lens opening of the camera lens module; and a pair of shutter driving sections respectively connected to the shutter blades via rotation links and each being configured for creating a pair of electromagnetically-opposite electromagnet poles and having a permanent magnet positioned between the poles such that a permanent magnet with at least one of the poles and connected to the rotation link is rotated due to a magnetic field created as current is applied to the electromagnet, to slidingly move an associated shutter blade.

U.S. Patent Publication (US 2007/0110433 to Masahiko) describes a shutter driving apparatus for a camera module having a shutter driving section constructed to slidingly move shutter blades provided to a camera lens module in both sideward directions to thereby open and close a lens opening. The shutter driving apparatus comprises a lens housing; a pair of shutter blades provided to the lens housing to be slidingly moved in a lengthwise direction of the lens housing to thereby open and close a lens opening of the camera lens module; and a pair of shutter driving sections respectively connected to the shutter blades via rotation links and each being configured for creating a pair of electromagnetically-opposite electromagnet poles and having a permanent magnet positioned between the poles such that a permanent magnet with at least one of the poles and connected to the rotation link is rotated due to a magnetic field created as current is applied to the electromagnet, to slidingly move an associated shutter blade.

SUMMARY OF THE INVENTION

A principal object of the present invention is to achieve methods and systems to achieve a precise timing of a shutter of a digital camera, which can be used also to control an aperture.

A further object of the present invention is to control the shutter by a feedback loop.

A further object of the present invention is to drive the blades of the shutter by at least one linear motor.

Another object of the present invention is to use a linear motor to sense the actual position of the shutter blades.

Another further object of the present invention is to achieve a read-out circuit to read out the actual position of the blades via an iron as part of a linear motor.

In accordance with the objects of this invention a method to achieve a precise timing of a shutter of a digital camera, which can be used also for a controllable aperture has been disclosed. The method invented comprises, firstly the steps of (1) providing a shutter system comprising at least one blade, a linear motor, comprising two coils, wrapped around a fixed iron and at least one magnet fastened on a movable device, which is mechanically connected to all blades, and a read-out circuit to measure the difference of inductance of both coils, and (2) modulating the currents driving the motor in order to move the blades to target position. The final steps are (3) measuring the difference of inductance of both coils, (4) comparing a signal defining the difference of inductance measured with a signal defining a target value, (5) moving entirety of shutter blades to target position according to difference of target signal to signal defining actual measurement of difference of inductance, and (6) reaching the target position if target signal is equal to a the signal corresponding to the difference of inductance measured.

In accordance with the objects of this invention a camera module to achieve a precise timing of a camera shutter, which can be used also for a controllable aperture, has been disclosed.

In accordance with the objects of this invention a camera module to achieve a precise timing of a camera shutter, which can be used also for a controllable aperture, has been disclosed. The system invented comprises, firstly, a movable lens barrel, one or more actuators to move said lens barrel, and a means to guide the movements of the lens barrel, Furthermore the camera module invented comprises one or more linear motors moving shutter blades to a target position having an integrated position sensing capability, wherein each motor comprises a first and a second coil and wherein a second terminal of a first coil is electrically connected to a measurement point and to a first terminal of a second coil. More over the camera module comprises a first power supply connected each via a modulating means to a first terminal of the first coil and to a second terminal of the second coil, a third modulating means connected between ground and the first terminal of the first coil, a fourth modulating means connected between ground and the second terminal of the second coil, and an amplifying means amplifying a signal taken at the measurement point. Finally the camera module comprises a sample-and hold means holding output signals of said amplifying means, and an integrated circuit controlling the motor driving the shutter and the actuators moving the lens barrel.

In accordance with the objects of this invention a camera module to achieve a precise timing of a camera shutter, which can be used also for a controllable aperture, has been disclosed. The system invented comprises, firstly, one or more linear motors moving shutter blades to a target position having an integrated position sensing capability, wherein each motor comprises a first and a second coil and wherein a second terminal of a first coil is electrically connected to a measurement point and to a first terminal of a second coil. Furthermore the system comprises a first power supply connected each via a modulating means to a first terminal of the first coil and to a second terminal of the second coil, a third modulating means connected between ground and the first terminal of the first coil, and a fourth modulating means connected between ground and the second terminal of the second coil. Finally the system comprises an amplifying means amplifying a signal taken at the measurement point, and a sample-and hold means holding output signals of said amplifying means.

BRIEF DESCRIPTION OF THE DRAWINGS

In the accompanying drawings forming a material part of this description, there is shown:

FIG. 6 explains the basic principle of the position sensing used with the present invention.

FIG. 7 shows a graph of the inductance of both coils L1 and L2 in dependency on the position of the magnet.

FIG. 8 shows a time diagram how the inductance delta measurement is performed in order to sense the actual position of the shutter blades.

DESCRIPTION OF THE PREFERRED EMBODIMENTS

The preferred embodiments disclose methods and systems for position control of shutters of cameras. The shutters invented are controlled by regulated feedback loops. The actual position of a shutter, the speed of the shutter and the shutter delay time can be constantly measured and controlled, enabling very fast shutter speed, and delay time.

A key advantage of the shutter invented is that a linear motor driving the shutter blades via a yoke can be used as a position sensor.

Figure 1:
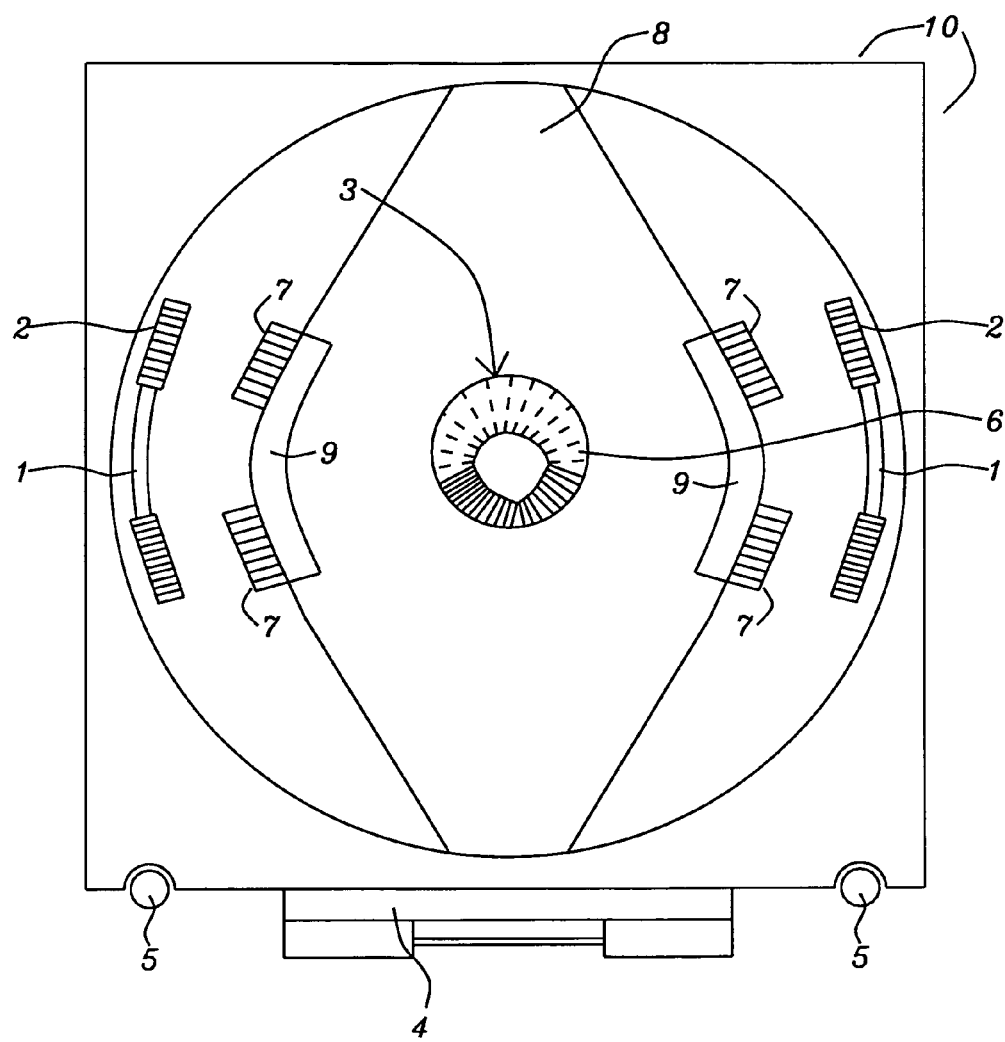
FIG. 1 shows a preferred embodiment of the shutter system invented. The shutter system is mounted on top of the lens barrel (not visible) or on top of the moving part of the lens system.

FIG. 1 shows a preferred embodiment of the shutter invented. The shutter is mounted on top of a lens barrel (not visible) or on top of the moving part of the lens system.

The coils 2 of two bidirectional linear motors driving shutter blades 6 are wrapped around iron coil cores 1. The coils 2 and iron coil cores 1 are mounted on the case of the shutter and inside of a lens barrel of a zoom lens system. Furthermore each linear motor driving shutter blades comprises two magnets 7 fastened on a movable yoke 8, which is mechanically connected to the shutter blades 6. The magnets are moved by magnetic force depending upon the currents through the coils 2 and the linear motors are moving the shutter blades 6 via the yoke 8. The opening 3 of the yoke 8 defines a maximal aperture opening.

The shutter case can move, together with the blades 6, coils 2 and coil cores 1, up and down along the optical axis of the camera depending upon the movements of the zoom lens barrel. The coils 2 are located on a fixed part of the shutter system. The energy to move the shutter blades comes from the coils. No flexible wires are required to drive the motors.

Another linear motor 4 positions the lens barrel to a zooming position. Balls 5 enable the movement of the lens positioning system inclusive of the shutter system. The shutter blades 6 move perpendicular to the optical axis of the camera. The shutter blades 6 themselves are driven by two linear motors having each two coils 2 and a two correspondent pieces of magnetic material fastened on the yoke 8. By supplying a current through the coils the correspondent magnets of the yoke will move together with the yoke 8 and the blades 6 in a direction dependent upon the direction of the current. The blades 6, which are mechanically connected to the yoke 8 are turning around their axis (not shown).

The blades of the shutter are moving continuously when the shutter is closed. This means that, when the movements of the blades are stopped, a stable position of the blades is reached and an aperture of any size can be achieved. The shutter positioning has actually two functions, controlling the position and the speed. This means that the shutter invented can take over the function of an aperture because any size of an aperture allowed by the lens barrel can be implemented before capturing an image. This can significantly improve the quality of an image.

A key item of the present invention is that the linear motor moving the blades is also used to sense the actual position of the blades. If the motor is moving, the metallic case 24 together with the magnets will cover the coils 23 more or less, i.e. the inductance changes with the actual position of the metallic case 24 with the magnets 23, thus enabling to sense the position of the blades. The difference of the inductance of the two coils 23 is correlated to the position of the blades.

Figure 2A:
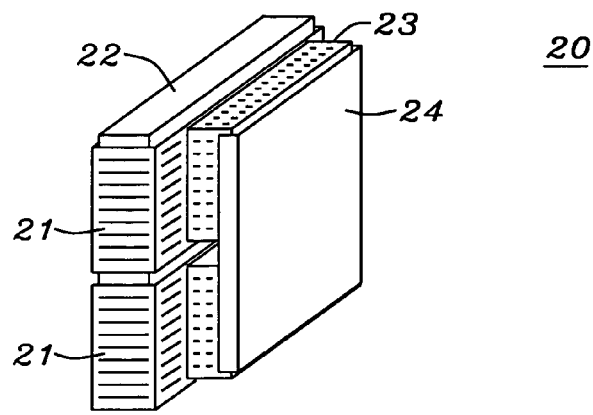
FIG. 2a shows an assembled view of simplified major components of a linear motor, which can be used to control the shutter blades.

FIG. 2a shows an assembled view of simplified major components of a linear motor 20, which can be used to control the shutter blades. The linear motor comprises a coil core 22 around which two coils 21 are wrapped. In order to avoid unnecessary complexity the coil core of FIG. 2a has a straight shape. The shape of the coil core can be adapted to specific requirements. Actually, as shown in FIG. 1, the coil core 1 is slightly bent to support circular movements of the yoke 8.

Furthermore the linear motor of FIG. 2a has a metallic case 24 containing two permanent magnets 23.

Figure 2B:
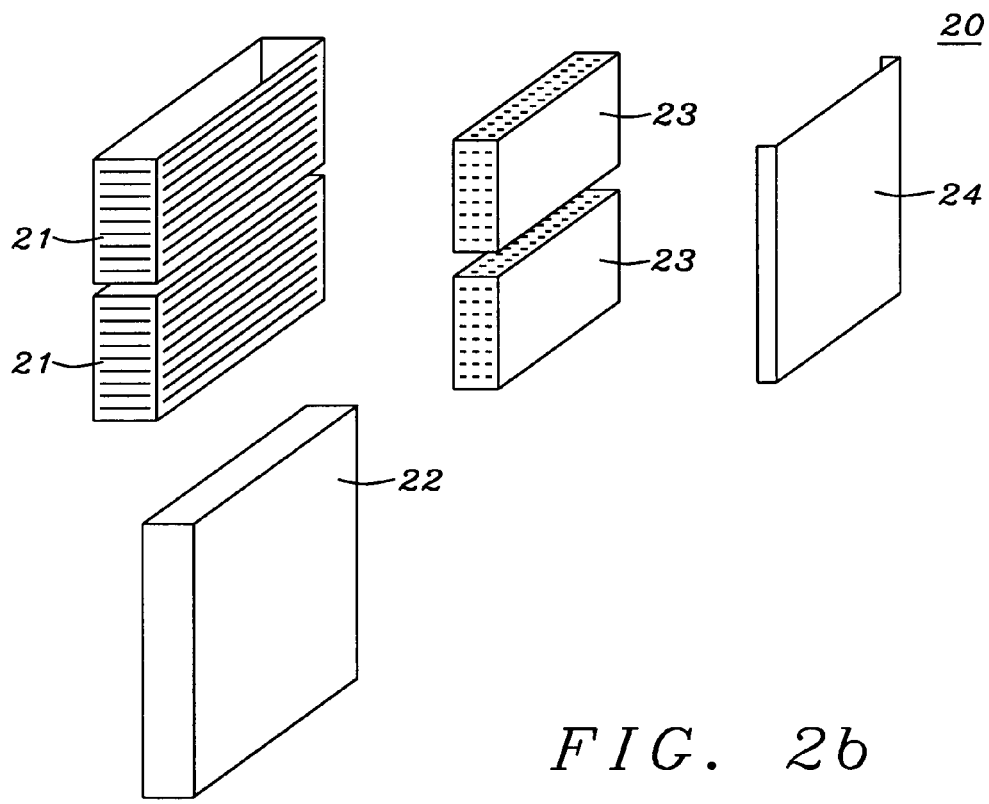
FIG. 2b shows an exploded view of the linear motor.

FIG. 2b shows an exploded view of the linear motor 20. It shows again the coil core 22, two coils 21, two permanent magnets 23, and the metallic case 24. It has to be noted that other types of motors could be used as well. Another type of a suitable motor could be a rotation symmetrical motor. A rotation symmetrical motor has more force and no magnetic force in one specific direction. This can be especially suitable for other geometries and shutter concepts.

Figure 2C:
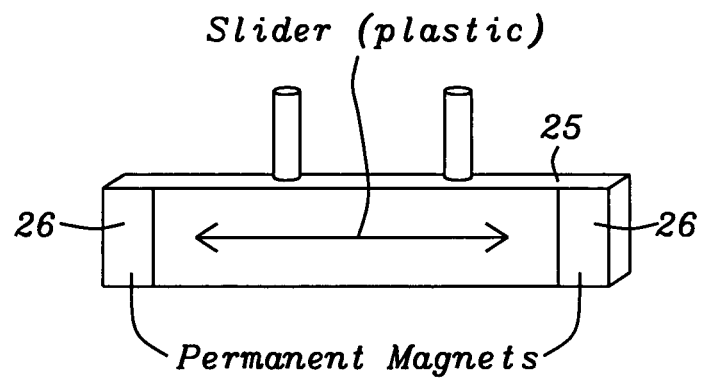
FIG. 2c shows a shutter/aperture actuator comprising in a preferred embodiment of the invention a plastic body and two permanent magnets at both ends of the body.
Figures 9, 10:
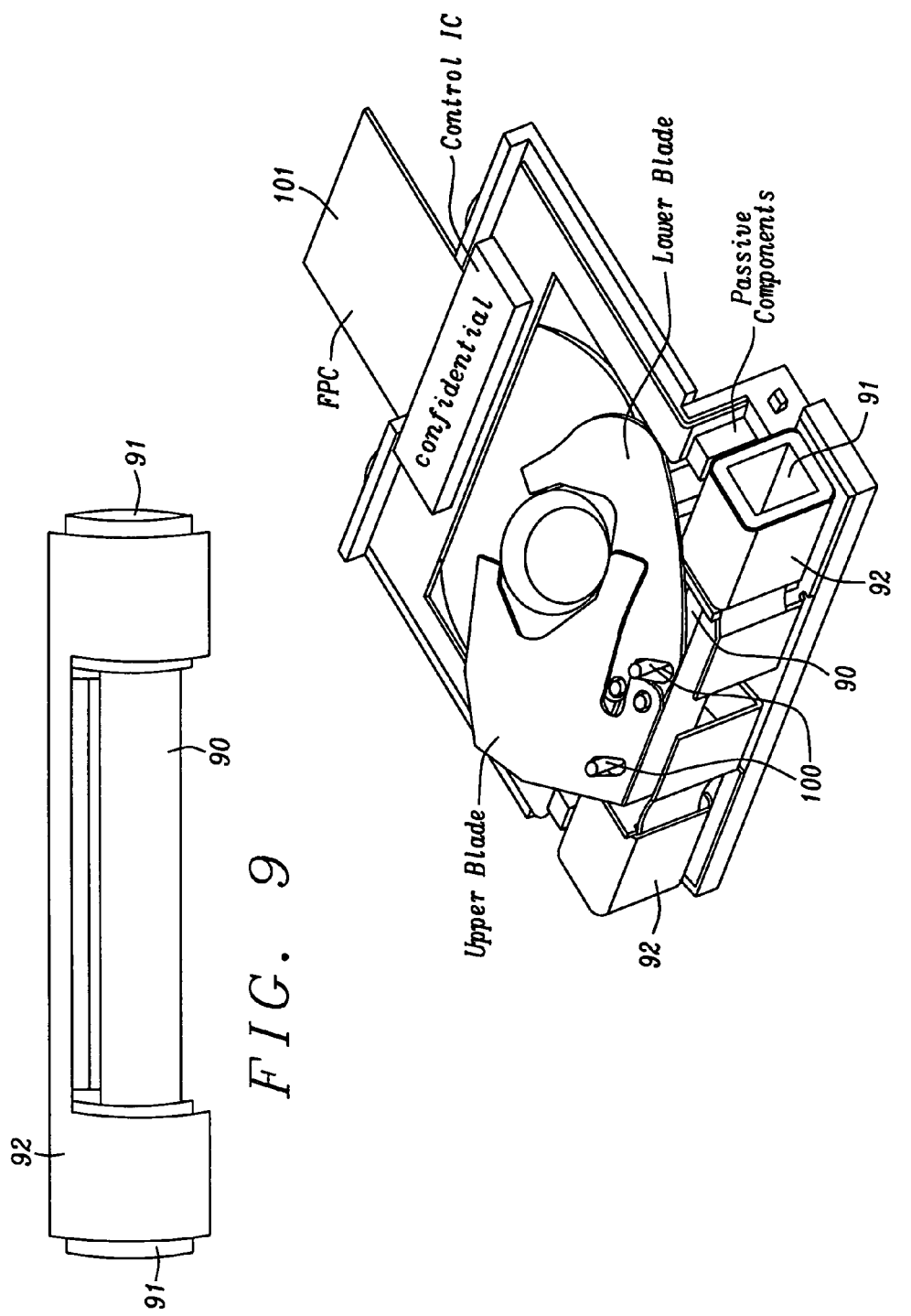
FIG. 9 illustrates another embodiment of a linear motor of the present invention. This motor type comprises a long Neodymium magnet and a coil at each end of the magnet.
FIG. 10 illustrates an embodiment of a shutter/aperture unit of the present invention.

FIG. 2c shows a shutter/aperture actuator comprising in a preferred embodiment of the invention a plastic body 25 and two permanent magnets 26 at both ends of the body 25. In an alternative embodiment of the invention the permanent magnets 26 are replaced by pieces of magnetic metal as e.g. iron. In this case a single motor can move the actuator in one direction only. Therefore, in case of using magnetic metal instead of permanent magnets, two motors are required to move the actuator forward and backward, each motor can move in one direction only. Furthermore FIG. 9 illustrates another embodiment of a linear motor of the present invention. This motor type comprises a long magnet 90 and a coil 91 at each end of the magnet 90. The magnetic field of magnet really exists only at both ends of a magnet and in the middle there is almost no magnetic force. The coils 91 at each end of the magnet 90 require a metallic connection 92 for a magnetic feedback. Preferably a Neodymium magnet is used for magnet 90. Other material could be used also for this magnet.

FIG. 10 illustrates an embodiment of a shutter/aperture unit of the present invention. An upper and a lower blade are moved via two pins 100 by magnet 90, as shown in FIG. 9. Also shown are the coils 91 at both ends of the magnet 90. The magnet 90 moves inside both coils 91 according to the direction of currents through the coils 91. Furthermore FIG. 10 shows a control IC controlling the movements of the motor driving the shutter blades and controlling a motor moving a lens barrel and a printed circuit 101.

Figure 3:
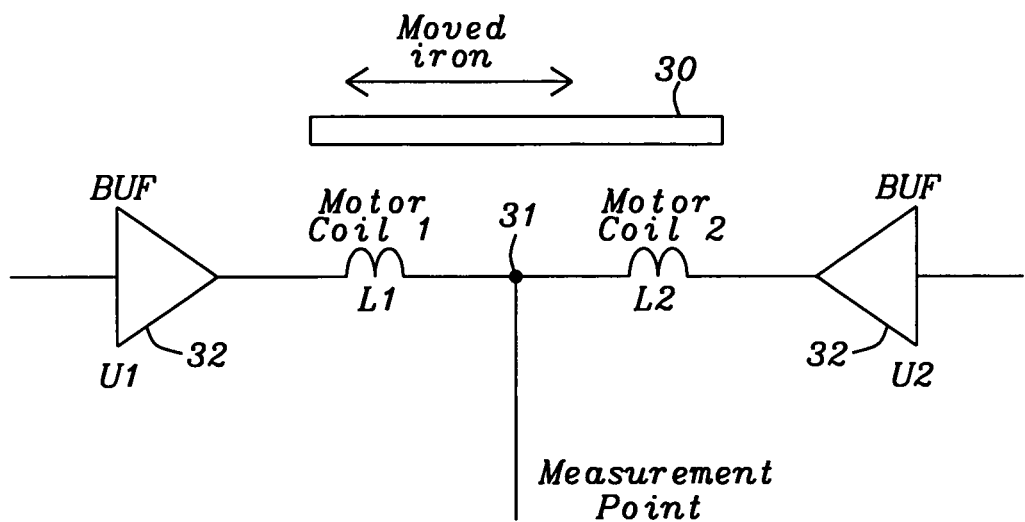
FIG. 3 shows the basic functions of the linear motor of the present invention and how the position sensing work using the linear motor.

FIG. 3 shows the basic functions of an embodiment of a linear motor of the present invention and how the position sensing work using the linear motor. It shows the two coils wrapped around a fixed iron as shown in FIG. 1. The iron or permanent magnet 30, fastened on a movable yoke, which is mechanically connected to the blades, moves as the blades move. The iron or permanent magnet 30 is driven by magnetic force depending upon the currents through the motor coils L1 and L2.

It is required to filter out the time constant of the motor from the position signal. In order to filter the time constant of the motor either an AC filter can be used or the time constant can be filtered using digital signal processing (DSP).

FIG. 6 explains the basic principle of the position sensing used with the present invention. The position detection is based on a measurement of an inductance delta in two coils L1 and L2 as shown in FIG. 6. A permanent magnet 60 moves within the two coils L1 and L2. The inductance of the coils L1 and L2 is dependent upon the actual position of the permanent magnet 60. As the magnet 60 moves into coil L2, as shown on the right side of FIG. 6, the inductance of L2 increases and the inductance of L1 decreases. Therefore by measuring a delta of inductance of both coils L1 and L2 the actual position of the magnet is determined.

FIG. 7 shows a graph of the inductance of both coils L1 and L2 in dependency on the position of magnet 60. The delta $\Delta L$ of inductance of both coils L1 and L2 can be used to determine the position of the magnet.

FIG. 8 shows a time diagram how the inductance delta measurement is performed in order to sense the actual position of the shutter blades. The inductance delta measurement is performed in a time-multiplexed scheme as shown in FIG. 8. The time slots shown are not to scale. The motor is driven most of the time and the measurement slots are very short compared to the driving phase. In a preferred embodiment the relation between driving phase and measurement is in the order of 80% to 20%. Other relations are possible as well.

Referring now again to FIG. 3, according to the basic principles of delta inductance measurement outlined above, as the iron or magnet 30 moves, the inductance of both motor coils and the inductive coupling between both motor coils changes. These effects can be measured. The amplitude of the signals gained from these effects is dependent upon the distance covered by the movements of the movable iron. The challenge is to separate the driving force, i.e. the currents required to move the iron, and the measurement of the inductance of these motor coils. Both motor coils can be looked at as a differential transformer.

The difference of inductance of both motor coils, caused by a movement of the iron or magnet 30, is detected at the measurement point 31, when buffers 32 and 33 are getting a signal of opposite polarity depending upon the distance of the movement of iron 30. The amplitude of the signal depends upon the difference of both inductances, or the difference of inductive cross coupling between both motor coils, caused by a movement of the iron 30. Another effect is a possible change of polarity of the signal if one motor coil has originally a higher inductance than the other motor coil. Due to a movement of the iron the inductance of the motor coil, which was originally smaller, gets possibly higher than the other one.

Figure 4:
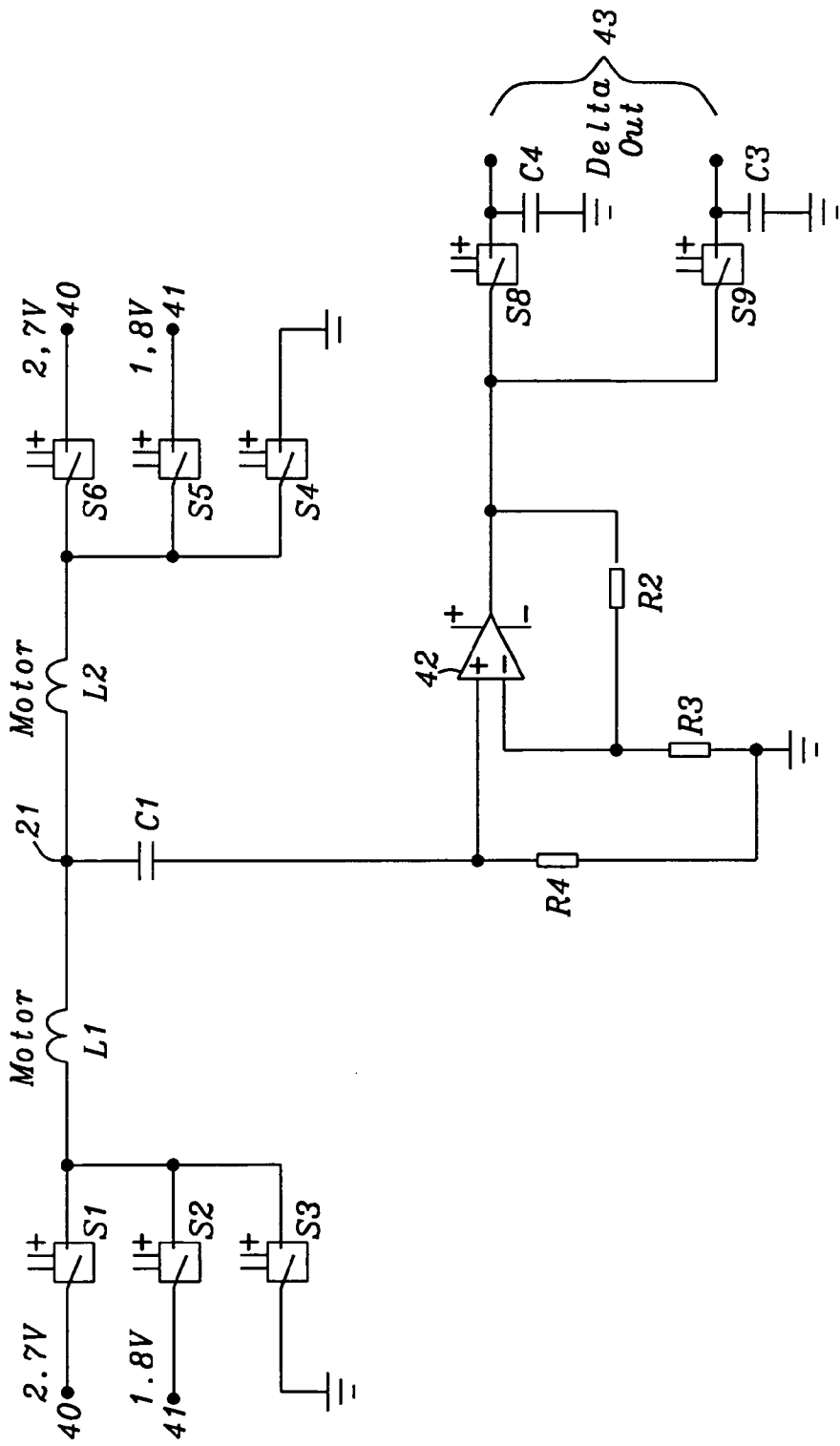
FIG. 4 illustrates various alternatives of circuits to control a position of a shutter blade.

FIG. 4 illustrates various alternatives of circuits to control a position of a shutter blade. Switches S1-S6 are used for modulation in regard of driving the motor. For example in a preferred embodiment of the invention the motor coils L1 and L2 are clocked by a frequency of 10 KHz (100 μs). Obviously other frequencies can be used as well.

In a first embodiment of the invention only 90 μs of the 100 μs is clock cycle are used to drive the motor, i.e. to drive the movable iron. The remaining 10 μs are used to measure the position of the movable iron, i.e. the position of a blade on which the movable iron is fastened. The position measurement during the remaining 10 μs is performed with a much higher frequency, e.g. with 1 MHz, i.e. 10 pulses of 1 μs. Other frequencies can be used for measurement as well, provided the measurement frequency is higher than the frequency used to drive the motor.

Only one supply voltage of the two supply voltages 40-41 shown in FIG. 4 is required for the first embodiment of the invention. The supply voltage could have either 2.7 V or 1.8 V as indicated in FIG. 4 or could have any other voltage in this order of magnitude. This means of course that only 4 switches are required for modulation of the motor drive.

The voltage at the measurement point 21 is sensed via capacitor C1 by a differential amplifier 42. An AC/DC coupling, comprising capacitor C1 and resistor R4, stabilizes the signal against virtual ground. Other AC/DC couplings could be used as well. A switch can alternatively replace resistor R4.

The switches S8 and S9 have a sample and hold function. They are sampling the modulated output signal of the amplifier 42. The output signal 43 could be buffered or amplified again. Additionally the output signal can be digitized.

The output signal 43 is used for controlling the position of the blades. This includes a comparison of the output signal 43, indicating the actual position of the blades, with a signal indicating a target position of the blades and the setting of the currents through both coils according to the difference of both signals in order to move the blades to the target position. In case both signals are equal the target position is reached.

It should be noted that other circuits for modulation are possible as well.

In regard of calibration of the shutter system mechanical stops are provided at both end positions of the shutter, i.e. shutter is fully open or fully closed. The differences of inductances in both end positions are measured and used to calibrate the shutter system.

The camera module invented furthermore comprises an integrated circuit (IC) controlling the actuators of the present invention, an image sensor, and a movable lens barrel in order to support an autofocus function of the camera. This IC also controls actuators with integrated position control to move the lens barrel of the camera module as required as disclosed in the patent application, titled "Camera Module having a low-friction movable lens", Ser. No. 12/661,752, filing date Mar. 23, 2010, and in the patent application, titled "Twin-actuator configuration for a camera module", Ser. No. 12/661,755, filing date Mar. 23, 2010.

Figure 5:
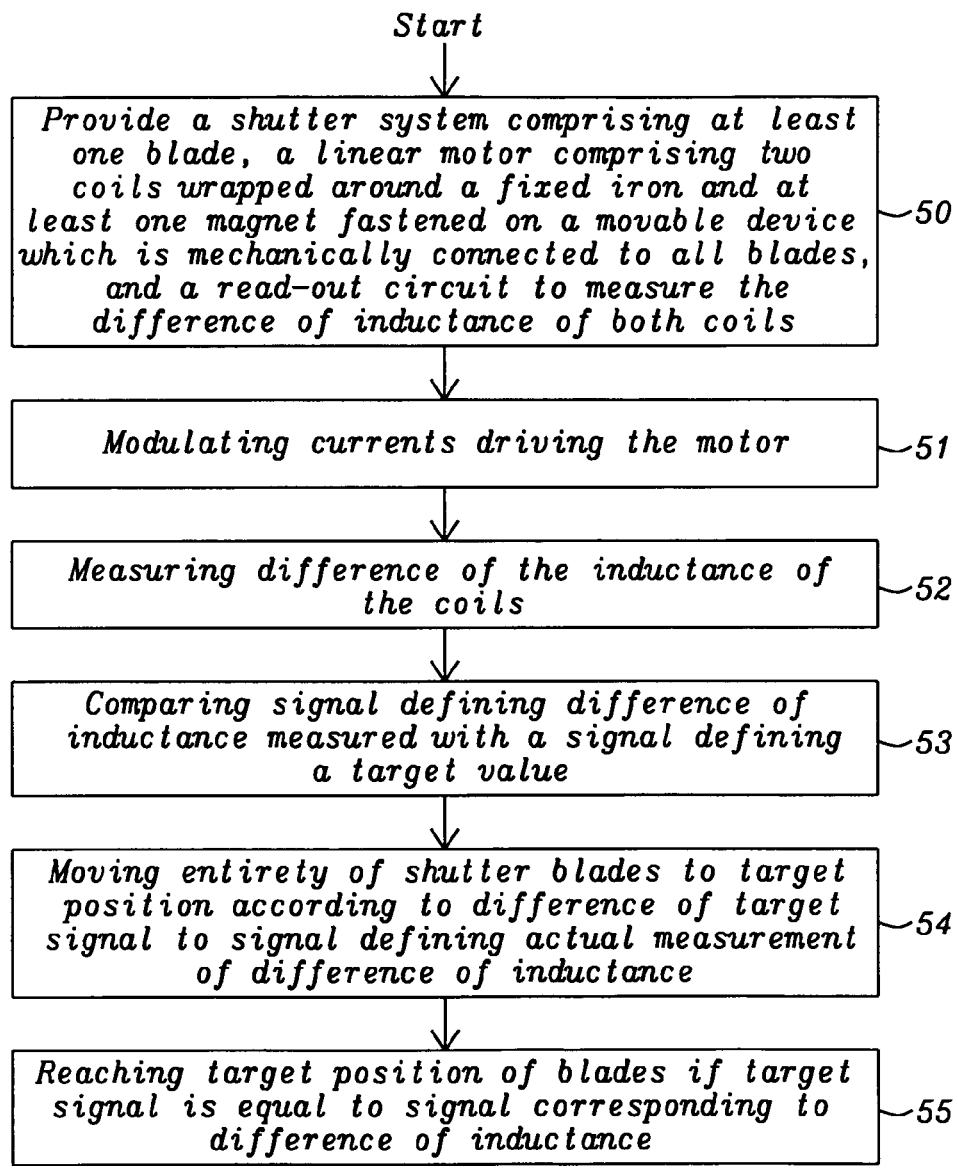
FIG. 5 illustrates a flowchart of a method invented to achieve a precise timing of a shutter of a digital camera, which can also be used to control an aperture.

FIG. 5 illustrates a flowchart of a method invented to achieve a precise timing of a shutter of a digital camera, which can also be used to control an aperture. The first step 50 illustrates providing a shutter system comprising at least one blade, a linear motor, comprising two coils, wrapped around a fixed iron and at least one magnet fastened on a movable device which is mechanically connected to all blades, and a read-out circuit to measure the difference of inductance of both coils. The next step 51 comprises modulating the currents driving the motor in order to move the blades to target position, followed by step 52 in which the difference of inductance of both coils is measured. The next step 53 describes comparing a signal defining the difference of inductance measured with a signal defining a target value and the following step 54 illustrates moving entirety of shutter blades to target position according to difference of target signal to signal defining actual measurement of difference of inductance. In the last step 55 the target position is reached if target signal is equal to a signal corresponding to the difference of inductance measured.

It should be noted that the shutter system invented is able to trigger the imager. By knowing the position of the shutter blades, the shutter arrives at an aperture position desired by the position sensing disclosed above. Even during movements of the shutter blades the image sensor can be triggered by the shutter control. The benefit is, there is no electronic or mechanical delay for the acceleration.

The shutter is able to change continuously the aperture's opening. This function is important for video and still cameras. It is possible to have a fixed exposure time and by changing the aperture's opening the brightness can be adjusted as desired.

While the invention has been particularly shown and described with reference to the preferred embodiments thereof, it will be understood by those skilled in the art that various changes in form and details may be made without departing from the spirit and scope of the invention.

What is claimed is:

1. A method to achieve a precise timing of a shutter of a digital camera, which can be used also for a controllable aperture, comprising the following steps:
    (1) providing a shutter system comprising at least one blade, a linear motor, comprising two coils, wrapped around a fixed iron and at least one magnet fastened on a movable device, which is mechanically connected to all blades, and a read-out circuit to measure a difference of inductance of both coils;
    (2) modulating currents driving the linear motor in order to move the blades to target position;
    (3) measuring a signal corresponding to the difference of inductance of both coils wherein a sample-and-hold technique is used to improve the read-out of the measurement signals representing the difference of inductance of both coils;
    (4) comparing a signal defining the difference of inductance measured with a signal defining a target value;
    (5) moving entirety of shutter blades to target position according to difference of target signal to signal defining the difference of inductance; and
    (6) reaching the target position if a target signal is equal to the signal corresponding to the difference of inductance measured.

2. The method of claim 1 wherein the measurement of the difference of inductances is taken on a measurement point, which is electrically between both coils.

3. The method of claim 1 wherein currents through both coils are modulated by a frequency in the order of magnitude of 10 KHz.

4. The method of claim 1 wherein a part of each modulation pulse is used to drive the linear motor and another part of each modulation pulse is used to measure the difference of induction of both coils.

5. The method of claim 1 wherein an AC/DC coupling in the read-out circuit is used to stabilize a signal representing the difference of inductance of both coils.

6. The method of claim 1 wherein the aperture's opening is modified continuously.

7. The method of claim 6 wherein an amount of light during exposure is adjusted by setting the opening of the aperture as required while an exposure time is fixed.

8. A camera module to achieve a precise timing of a camera shutter which can be used also for a controllable aperture comprises:
   an image sensor;
   a movable lens barrel;
   one or more actuators to move said lens barrel;
   a means to guide the movements of the lens barrel;
   one or more linear motors moving shutter blades to a target position having an integrated position sensing capability, wherein each motor comprises a first and a second coil and wherein a second terminal of a first coil is electrically connected to a measurement point and to a first terminal of a second coil;
   a first power supply connected each via a first modulating means to a first terminal of the first coil and via a fourth modulation means to a second terminal of the second coil;
   a second modulating means connected between ground and the first terminal of the first coil;
   a third modulating means connected between ground and the second terminal of the second coil;
   an amplifying means amplifying a signal taken at the measurement point;
   a sample-and hold means holding output signals of said amplifying means; and
   an integrated circuit controlling the motor driving the shutter and the actuators moving the lens barrel.

9. The camera module of claim 8 wherein said means to guide the movements of the movable lens barrel are ball bearings.

10. A camera module to achieve a precise timing of a camera shutter which can be used also for a controllable aperture comprises:
   one or more linear motors moving shutter blades to a target position having an integrated position sensing capability, wherein each motor comprises a first and a second coil and wherein a second terminal of a first coil is electrically connected to a measurement point and to a first terminal of a second coil;
   a first power supply connected each via a first modulating means to a first terminal of the first coil and via a fourth modulating means to a second terminal of the second coil;
   a second modulating means connected between ground and the first terminal of the first coil;
   a third modulating means connected between ground and the second terminal of the second coil;
   an amplifying means amplifying a signal taken at the measurement point; and
   a sample-and hold means holding output signals of said amplifying means.

11. The camera module of claim 10 wherein an AC/DC coupling is connected between the measurement point and an input of the amplifying means.

12. The camera module of claim 11 wherein said AC/DC coupling comprises a first capacitor connected between the measurement point and a first input of the amplifying means and a resistor connected between the first input of the amplifying means and ground.

13. The camera module of claim 12 wherein said resistor is replaced by a switch.

14. The camera module of claim 10 wherein said sample-and-hold means comprises
   a fifth modulating means, wherein its input is connected to the output of the amplifying means and its output is connected to a first terminal of an output of the system;
   a second capacitor connected been ground and the first output terminal of the system;
   a sixth modulating means, wherein its input is connected to the output of the amplifying means and its output is connected to a second terminal of the output of the system; and
   a third capacitor connected been ground and the second output terminal of the system.

15. The camera module of claim 14 wherein said modulating means are switches.

16. The camera module of claim 10 wherein said amplifying means is a differential amplifier.

17. The camera module of claim 10 wherein a part of each modulation pulse is used to drive the linear motor and another part of each modulation pulse is used to measure a difference of induction of both coils.

18. The camera module of claim 10 wherein a second power supply is connected each via a seventh modulating means to a first terminal of the first coil and via an eighth modulation means to a second terminal of the second coil.

19. The camera module of claim 18 wherein the first power supply is used to drive the linear motor and the second power supply is used to measure a difference of induction of both coils.

20. The camera module of claim 10 wherein the output signal of said sample-and hold means is used to control in a feedback loop the linear motor in order to move the shutter blades to a desired position.

21. The camera module of claim 10 wherein each of said one or more linear motors comprises:
   two coils wrapped around a fixed iron; and
   an iron fastened on a movable device, which is mechanically connected to an entirety of shutter blades.

22. The camera module of claim 10 wherein each of said one or more linear motors comprises:
   two coils, located at both ends of the permanent magnet, wherein the permanent magnet moves within both coils depending on currents flowing through both coils; and
   pins fastened on the permanent magnets moving blades of the shutter, wherein the pins are inserted to the blades by through-holes in the blades.

23. The camera module of claim 10 wherein said permanent magnet is a neodymium magnet.

* * * * *

UNITED STATES PATENT AND TRADEMARK OFFICE
CERTIFICATE OF CORRECTION

PATENT NO. : 8,547,477 B2  Page 1 of 1
APPLICATION NO. : 12/658280
DATED : October 1, 2013
INVENTOR(S) : Knödgen et al.

It is certified that error appears in the above-identified patent and that said Letters Patent is hereby corrected as shown below:

In the Specification

In Column 7, Line 16, before "clock" delete "is".

In Column 7, Line 60, delete "application," and insert -- application DI09-003/004, --, therefor.

In Column 7, Line 62, delete "application," and insert -- application DI09-007, --, therefor.

In the Claims

In Column 10, Line 18, in Claim 14, delete "been" and insert -- between --, therefor.

In Column 10, Line 24, in Claim 14, delete "been" and insert -- between --, therefor.

Signed and Sealed this
Second Day of September, 2014

Michelle K. Lee
*Deputy Director of the United States Patent and Trademark Office*